United States Patent

[11] 3,615,265

[72] Inventor  Rainer Gartner
              Loderburg, Germany
[21] Appl. No. 859,459
[22] Filed     Sept. 19, 1969
[45] Patented  Oct. 26, 1971
[73] Assignee  Veb Kombinat Kali
               Sondershausen, Germany

[54] PROCESS FOR DRYING BROMINE
     4 Claims, 1 Drawing Fig.
[52] U.S. Cl. .................................................. 23/307,
                                                          23/216
[51] Int. Cl. ...................................................... C01b 7/00,
                                                     B01d 1/02, B01d 1/22
[50] Field of Search ......................................... 23/216,
              217, 218, 307; 159/22, 23, 43, DIG. 25, 1 C

[56]             References Cited
             UNITED STATES PATENTS
1,141,922   6/1915   Barstow ........................   23/216
1,885,029  10/1932   Dressel .........................  23/216 X
2,359,221   9/1944   Kenaga .........................   23/216
2,471,035   5/1949   Hurd ............................    34/92
3,493,469   2/1970   Porter ..........................  202/176

Primary Examiner—Norman Yudkoff
Assistant Examiner—J. Sofer
Attorney—Nolte and Nolte ABSTRACT: Bromine, kept at an elevated temperature, preferably at about its boiling point, gradually loses water and may be obtained essentially dry without any drying agent. The process is also useful to remove chlorine.

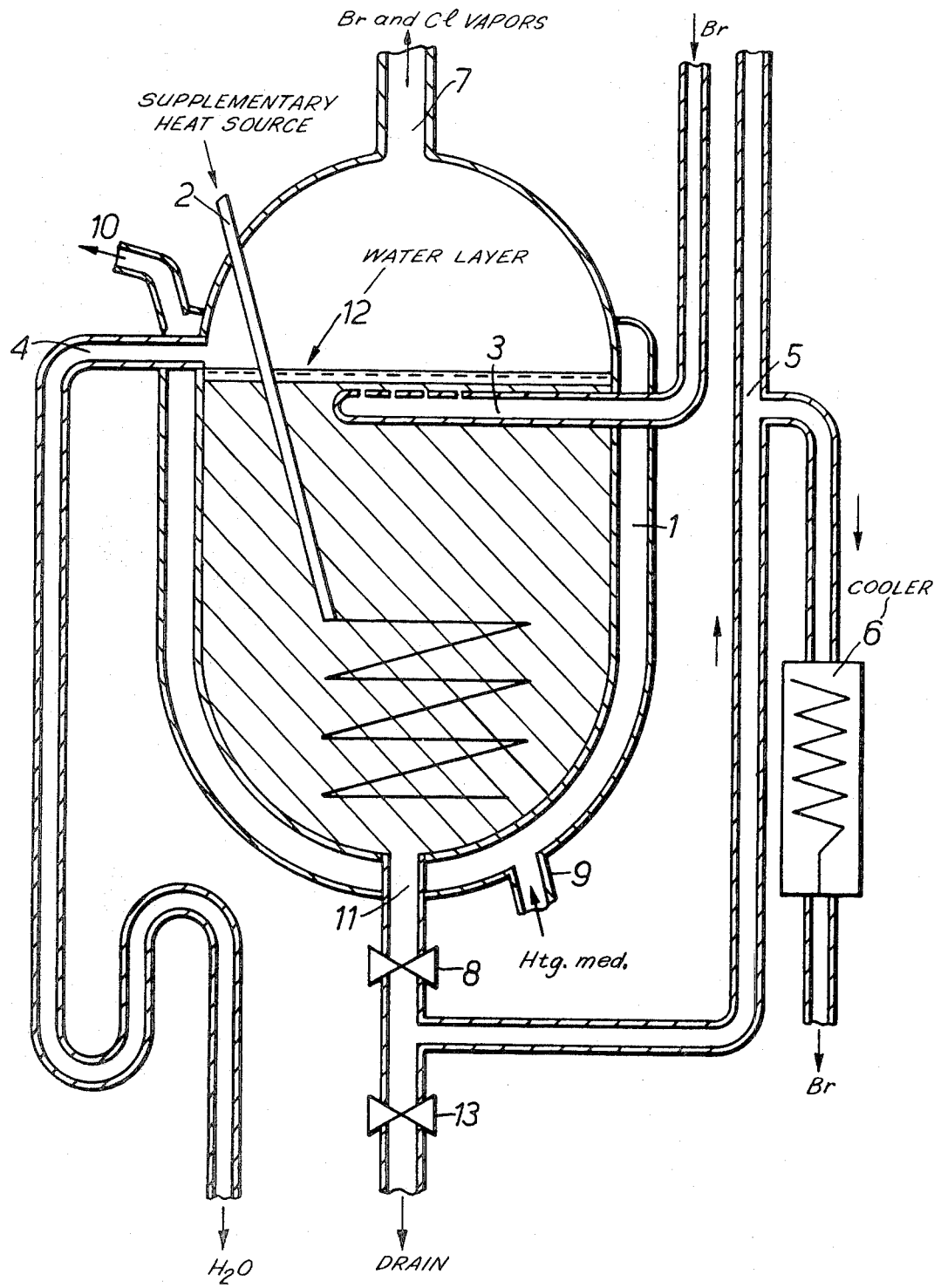

PROCESS FOR DRYING BROMINE

This invention deals with bromine and specifically with a process for drying bromine. In many industrial applications, it is advantageous to use dry bromine, because the latter is made less corrosive than bromine saturated with water. Many processes have been proposed for drying bromine. They all utilize a drying agent for the adsorption of water. The use of a drying agent, however, is accompanied by many drawbacks. If the drying agent is a solid, for instance an inorganic salt, solid incrustations form on the surface, which become syrupy and impermeable. When liquid drying agents are used, for instance sulfuric acid, it is necessary to provide for a great surface of contact, either by dispersion or distillation. With both solid as well as liquid drying agents, the possibility exists that the bromine becomes contaminated. Another drawback resulting from the use of drying agents is that the drying agent must be regenerated or a fresh portion must be used at very frequent intervals.

One object of this invention is to provide a process for drying bromine which is economical and superior to other processes known in the art and which obviates the need of drying agents.

Another object is to provide a process which gives bromine a high degree of purity and which is free from the drawbacks of other known processes.

A further object is to provide a process which is successful for the removal of the major portion of chlorine, in addition to the removal of water.

The crux of this invention resides in the finding that the water content of bromine saturated with water, depends upon the temperature of saturation. At 20° C., the maximum content of water is 0.034 percent, but at 30° C., it is 0.0075 percent, and by adjusting the temperature to about 50° C., all the water separates, over a period of time, until the residual water is at the most 0.001 percent. A substantial proportion of water is removed within the first few hours. If the temperature is adjusted close to the boiling point of bromine, the separation of water proceeds faster.

The following table gives the maximum water content and maximum chlorine content of one liter of bromine, at 50° C., after each specified period of time.

Percent of Water and Chlorine in 1 liter of Bromine at 50° C.

| Duration of heating | Maximum water content in % | Maximum chlorine content in % |
|---|---|---|
| 0 mins. | 0.05 | 0.12 |
| 10 mins. | 0.038 | |
| 20 mins. | 0.022 | |
| 1 hr. | 0.011 | |
| 2 hrs. | 0.0075 | 0.06 |
| 4 hrs. | 0.0055 | 0.06 |
| 8 hrs. | 0.004 | |
| 16 hrs. | 0.003 | |

The data in the foregoing table demonstrate that the proportion of water being removed depends upon the length of time and the temperature at which bromine is heated. If a sufficiently long period of time is allowed and if the temperature is sufficiently high, liquid bromine may be obtained dry, without the use of drying agents. The dry bromine, on cooling, takes up the water which had separated, but only extremely slowly. More specifically, bromine will take up the amount of water corresponding to saturation only after standing several weeks with a layer of water.

The data in the table also show that the process in accordance with this invention permits a substantial removal of chlorine from bromine so that bromine is obtained with a low chlorine content. The residual chlorine may later be removed by evaporation.

The invention will now be illustrated by reference to the accompanying drawing which represents schematically an apparatus for carrying out the process described hereinabove. The apparatus has an internal enamel lining. Numeral 1 designates a heating jacket and numerals 9 and 10 designate the inlet and the outlet respectively for the fluid being passed within the jacket. Bromine, from a raffination plant, previously warmed to a temperature close to the boiling point, suitably 50° C., is allowed to flow through the inlet tube 3. Numeral 5 designates a siphon which is at the same level as the inlet tube 3. Water separates gradually from the bromine, and forms a layer 12 on the surface of the bromine. The water which separates from the bromine, runs out from the tube shown at 4.

The amount of dry bromine removed by means of the siphon 5 is controlled by the amount of bromine introduced into the apparatus. The bromine removed from the bottom of the apparatus, at 11, is cooled in the cooler 6, and is then led into either a storage vessel or may be immediately drawn off. Numerals 8 and 13 designate two valves which are advantageously inserted in the apparatus, one immediately below the outlet 11 and the other at a level lower than the outlet for the bromine. The valves may be operated whenever too much pressure builds up in the apparatus, or if it is desired to discontinue the operation and drain the entire content.

Numeral 7 designates a conduit in the lid of the apparatus for communication with the raffination plant. Bromine and chlorine which evaporate may be recovered through conduit 7 and led back into the raffination plant.

It is possible to use a source of heat within the heating vessel, shown by the numeral 2, which may be used either together with the outer heating jacket or instead of the outer heating jacket.

The process described herein gives essentially dry bromine suitable for storage in large reservoirs, or in ampoules. Since corrosion to apparatus and materials, in general, is much lower with dry bromine as compared with bromine which contains some water, the importance of using dry bromine in industrial applications is clear. The process according to this invention may be conducted either on a continuous scale or discontinuously. The results are reproducible and the amount of water which can be removed, given a determined amount of bromine, may be determined. The process also provides a specified minimum period of time for achieving the required degree of water removal.

What is claimed is:

1. Process for removing water from a solution consisting essentially of bromine saturated with water at a temperature below 50° C. which comprises heating the solution to a temperature and for a time sufficient for the water to form a separate phase on the surface of the bromine and the water content of the solution to be reduced to no more than about 0.001 percent and isolating the layer of water from the bromine.

2. Process according to claim 1 which comprises heating the solution to a temperature about the boiling point thereof.

3. Process according to claim 1 wherein any chlorine additionally separated from said bromine by the heating is separately removed.

4. Process according to claim 1 which comprises heating said solution to a temperature of about 50° C.

* * * * *